(12) United States Patent
Nelson et al.

(10) Patent No.: US 9,561,809 B2
(45) Date of Patent: Feb. 7, 2017

(54) RAIL ROAD TRACK LUBRICATION APPARATUS AND METHOD

(71) Applicants: Roy L Nelson, Lakeville, MN (US); Robert G Pieper, Minnetonka, MN (US)

(72) Inventors: Roy L Nelson, Lakeville, MN (US); Robert G Pieper, Minnetonka, MN (US)

(73) Assignee: RBL, INC., Minneapolis, MN (US)

( * ) Notice: Subject to any disclaimer, the term of this patent is extended or adjusted under 35 U.S.C. 154(b) by 234 days.

(21) Appl. No.: 14/460,645

(22) Filed: Aug. 15, 2014

(65) Prior Publication Data

US 2015/0034422 A1 Feb. 5, 2015

Related U.S. Application Data

(63) Continuation of application No. PCT/US2013/026360, filed on Feb. 15, 2013.

(60) Provisional application No. 61/599,495, filed on Feb. 16, 2012.

(51) Int. Cl.
*B61K 3/00* (2006.01)
*F16N 7/00* (2006.01)

(52) U.S. Cl.
CPC .. *B61K 3/00* (2013.01); *F16N 7/00* (2013.01)

(58) Field of Classification Search
CPC ........................................................ B61K 3/00
See application file for complete search history.

(56) References Cited

U.S. PATENT DOCUMENTS

| 1,890,605 | A | * | 12/1932 | Graham | B61K 3/00 104/279 |
| 2,183,727 | A | * | 12/1939 | Stern | B61K 3/00 184/3.1 |
| 2,285,082 | A | * | 6/1942 | Bolt | B61K 3/00 184/3.1 |
| 4,520,901 | A | * | 6/1985 | Borup | B61K 3/00 184/15.3 |

(Continued)

FOREIGN PATENT DOCUMENTS

| RU | 2094276 C1 | 10/1997 |
| RU | 80815 U1 | 2/2009 |
| RU | 2422313 C1 | 6/2011 |

OTHER PUBLICATIONS

Search Report and Written Opinion for PCT/US2013/026360, mailed Jun. 6, 2013.

*Primary Examiner* — Minh Truong
(74) *Attorney, Agent, or Firm* — Westman, Champlin & Koehler, P.A.; Z. Peter Sawicki

(57) ABSTRACT

An apparatus and method for applying lubricant to a rail road track. The apparatus comprising a control module; a housing; a lubricant distribution block; and a plurality of tubes for connecting the control module to the housing wherein the housing houses the lubricant distribution block. The control module is positionable in close proximity to the rail road track and the housing is positionable adjacent to and along a section of rail road track to be lubricated. The lubricant is stored in a vessel in the control module and pumped from the control module to a lubricant distribution nozzle connected to the housing and wherein sliding the lubricant distribution nozzle along the section of rail road track in a first or second direction distributes lubricant along the section of rail road track.

7 Claims, 4 Drawing Sheets

(56) References Cited

U.S. PATENT DOCUMENTS

| | | | |
|---|---|---|---|
| 6,578,669 B2 * | 6/2003 | Kast | B61K 3/02 |
| | | | 184/3.2 |
| 6,631,786 B1 | 10/2003 | Gunacker | |
| 8,584,804 B2 * | 11/2013 | Holland | B61K 3/00 |
| | | | 104/279 |
| 2002/0056592 A1 | 5/2002 | Arens et al. | |
| 2004/0050623 A1 * | 3/2004 | Urmson, Jr. | B61K 3/00 |
| | | | 184/3.1 |

* cited by examiner

RAIL ROAD TRACK LUBRICATION APPARATUS AND METHOD

BACKGROUND OF THE INVENTION

This disclosure relates to the distribution of lubricant on the gauge face or inside of the rail of railroad tracks through the use of an automatic sensor driven hydraulic system. The system allows for distribution of a greatly reduced amount of lubricant or grease to a targeted area.

Due to the enormous weight and centrifugal force involved with locomotives and rolling stock, a surprising amount of cohesion exists. This cohesion is between the wheel flange and the rail gauge face. Tiny flakes of steel from the rail and wheels are removed as a train's inside wheel contacts the rail. The only way to prevent such an occurrence is to apply lubrication to reduce cohesion.

Generally lubricant, or grease, is applied to the gauge face or inside of the rails at the point of wheel and rail contact. Currently, lubricant is applied by a wayside lubrication system that pumps lubricant to a distribution bar. This lubrication bar has many grooves from the top of the bar to a distribution port. This method piles large amounts of grease or lubricant toward the top of the rail. When the pile gets large enough the train wheels will contact the pile of grease or lubricant and spread the grease down the track. This method causes excessive throw off of grease or lubricant.

A problem occurs in lubricant application in that the excess amount of lubrication currently used coats an unnecessarily thick layer on the rail. This layer covers the tops of the rails and the lubricant is then inadvertently carried by the wheels to inclines or to other non-curved sections of the track. At areas where the tracks are inclined, friction is needed and the excess lubrication has an adverse effect on traction. In addition, the amount of lubricant currently required for minimum coverage is expensive.

This excess lubricant also covers the earthen area surrounding the rail section. As lubricant is applied now, a large amount is pumped in order to make sure the small area that needs lubrication is actually covered when a wheel comes in contact with it. This excess lubricant ends up not only coating the entire rail, but the ground surrounding it. While there may occasionally be pads laid down to absorb some of this excess lubricant, much of the excess seeps into the ground and migrates. This has negative impacts on the environment. Considering that major portions of railroad are set away from city areas, the lubricant can migrate into the environment near the tracks. Negative effects on the environment are compounded when the rails need to be repeatedly lubricated over time. Reducing the amount of lubricant needed will not only save money, it can reduce, if not eliminate any negative impact on the environment.

SUMMARY OF THE INVENTION

This disclosure relates to an apparatus for applying lubrication to a rail road track. The apparatus comprises a control module, a housing, a lubricant distribution block, and a plurality of tubes for connecting the control module to the housing. The housing houses the lubricant distribution block and the housing is connected to the control module by the plurality of tubes. The control module is positionable in close proximity to the rail road track and the housing is positionable adjacent to and along a section of rail road track to be lubricated.

This disclosure also relates to a method for applying lubricant to a section of rail road track. The method comprises storing lubricant in a vessel in a control module, the control module positioned proximate the section of rail road track and pumping lubricant from the control module to a lubricant distribution nozzle connected to a housing. The housing is positioned adjacent to and along the section of rail road track and sliding the lubricant distribution nozzle along the section of rail road track in a first direction will distribute lubricant along the section of rail road track.

DETAILED DESCRIPTION OF THE INVENTION

This invention relates to the application of lubrication to only a limited portion of rail where lubrication is actually needed. Large amounts of lubrication and money will be saved by applying a limited amount of lubricant at a more precise time of applying lubrication. Applying lubrication just before a wheel comes in contact with the rail will reduce the amount of lubricant needed. The lubricant will be carried by the wheels immediately after application rather than migrating to other portions of the rail, or the ground.

Figure 1:
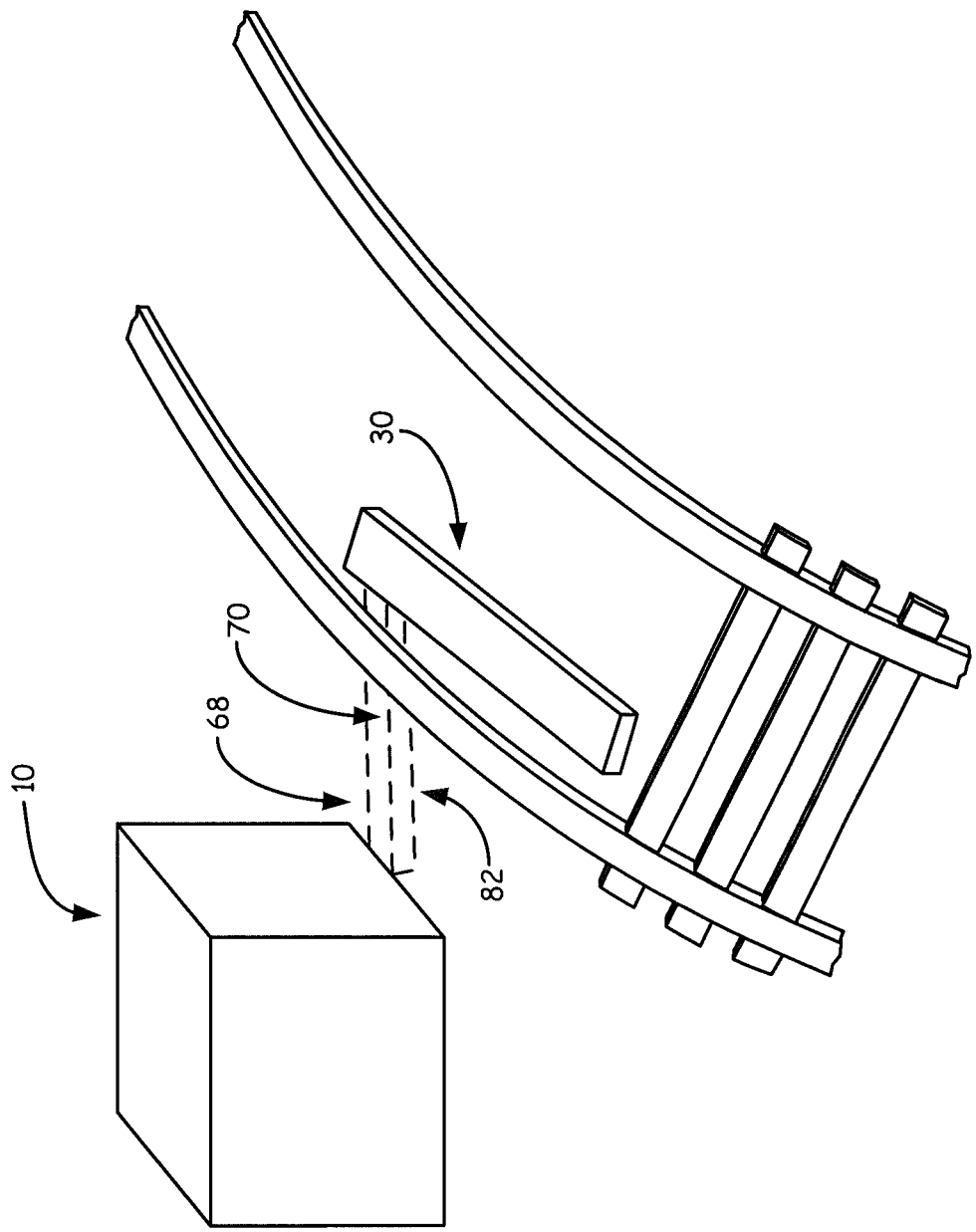
FIG. 1 is a perspective view of the present invention as in place for use.

As illustrated in FIG. 1, the present invention is generally comprised of three major components. The first is a control module 10. The control module 10 houses the major pressure, power and lubrication storage components of the invention. The control module 10 is stationed adjacent to a portion of railroad track. Second, the linear slide rack 30 houses the lubrication application components. The linear slide rack 30 is positioned in the track in close proximity to the surface in need of lubrication. The linear slide rack 30 is secured to the rails. Third, a series of steel tubes 68 and 70, for pressure and return lines, connects the control module 10 to the linear slide rack 30. The steel tubes 68 and 70 for pressure and return lines are to be buried at a depth under the tracks, deep enough to allow for track and ballast maintenance. When connected, the lubrication process is initiated in the control module 10. The control module is equipped for manual initiation as well as automatic initiation of the lubrication process. The linear slide rack 30 contains the components that then carry out the lubrication distribution process.

Figure 2:
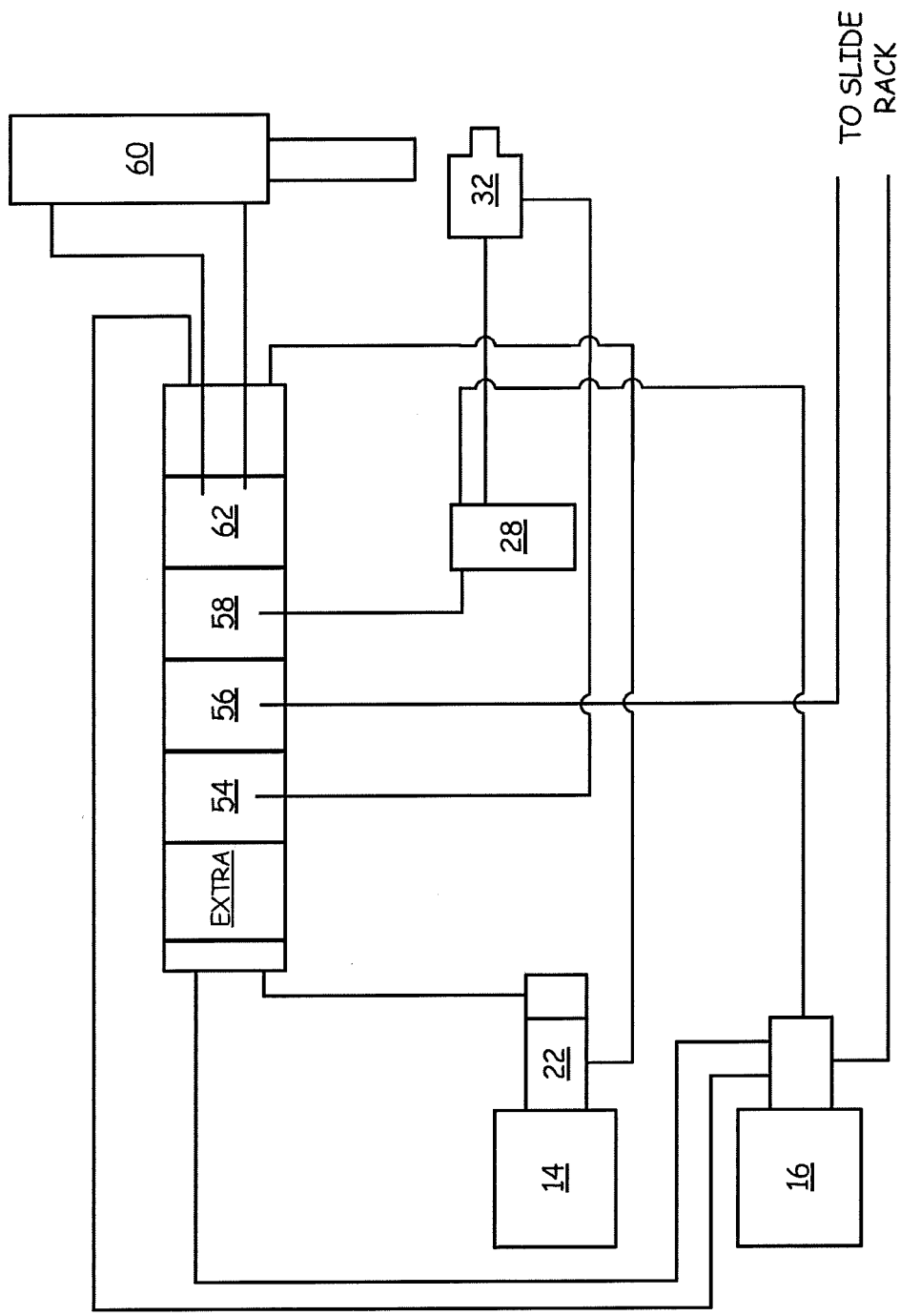
FIG. 2 is a schematic view of the invention.

Illustrated in FIG. 1 is the control module housing 10. FIG. 2 is a schematic of the internal components of the housing 10. A control module housing 10 contains an electric motor, gas engine, LP engine, or diesel engine 14. A hydraulic reservoir 16 in the control module 12 provides storage for hydraulic oil. A dual section hydraulic pump 22 provides 23 GPM @ 2300 PSI for the large section and 3 GPM @ 1400 PSI for the small section. The module housing 10 includes a Programmable Logic Control that provides for the control of all of the electrical functions necessary. Illustrated in further detail in FIG. 2 is a hydraulic flow diagram of the components from the control module 10 to the application process in the linear side rack 30.

The electric motor or fueled engine 14 provides mechanical motion to drive a hydraulic pump 22. The hydraulic pump 22 provides pressure and volume. The hydraulic pump directs pressure to a hydraulic directional valve section 62 and accepts and directs return hydraulic pressure to a hydraulic reservoir 16. The hydraulic directional valve section 58 directs hydraulic pressure and flow to a hydraulic grease pump 28. The hydraulic directional valve also directs hydraulic pressure and flow to the hydraulic cylinder.

Figure 3:
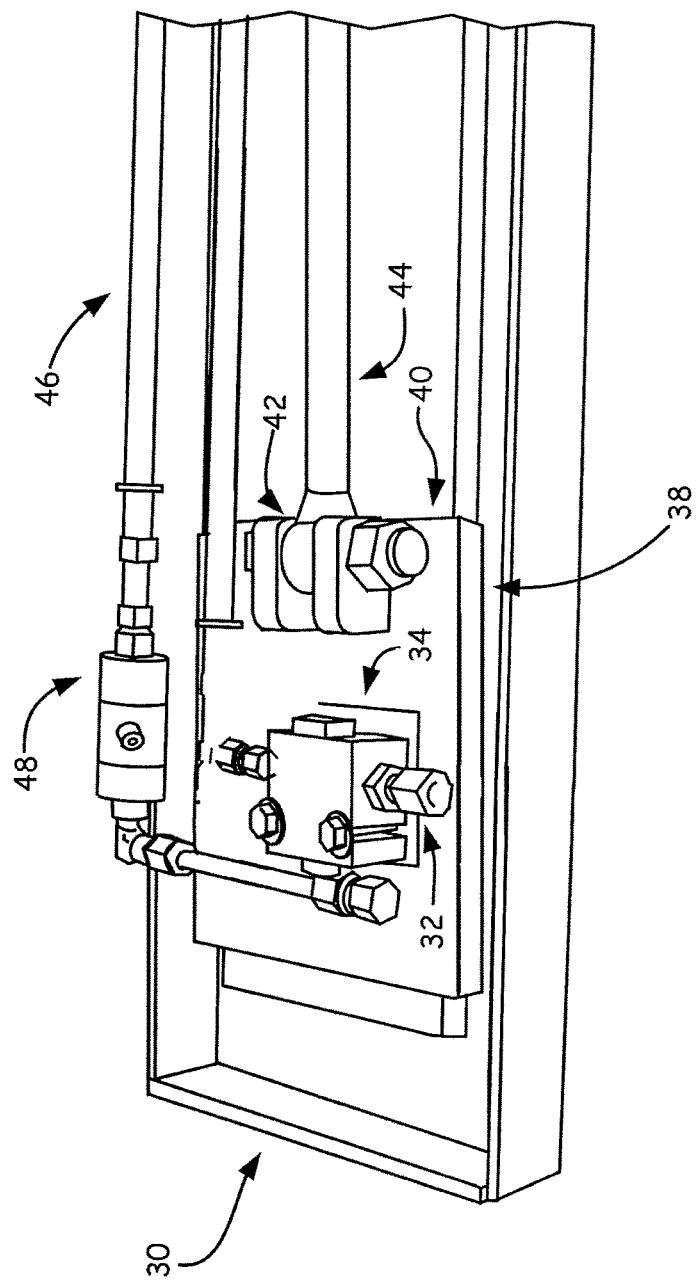
FIG. 3 is a perspective view of a process of the invention.
Figure 4:
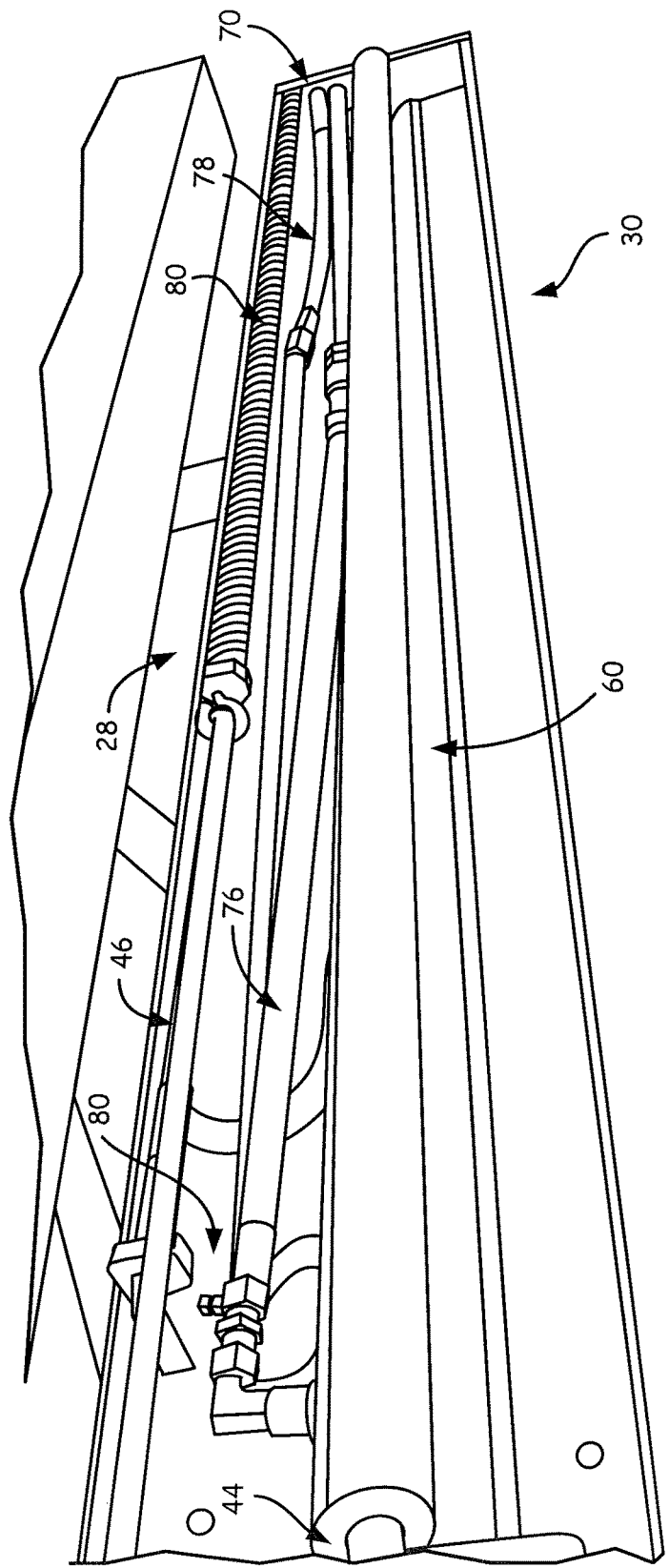
FIG. 4 is a perspective view of still a further component of the invention.

In further detail, as can be seen in FIGS. 3 and 4 the linear slide rack 30 is an enclosure made from suitable material, preferably aluminum. The linear side rack 30 has a removable cover for easy access to the inside components. The linear slide rack 30 is secured to the base of a portion of rail by mounting brackets or other suitable fasteners (not shown). The lubricant is distributed to the gauge face side of the railroad track by a lubricant distribution nozzle 32. The term "lubricant" as used herein means the type of lubricant used to effect rail adhesion and rail and wheel wear protection. Preferably, such lubricant has some rain resistance and ability to be "carried" down a rail by a wheel engaging the rail. The words "lubricant" and "grease" are used interchangeably herein. Suitable lubricants are made from a variety of materials and are available commercially as "rail lubricants".

The lubricant distribution nozzle 32 is attached to a lubricant distribution block 34 in which lubricant is delivered to the gauge face of the rail. The lubricant distribution block 34 is comprised of a small aluminum or other suitable metal box or riser to raise the nozzle 32 to the height of the intended lubrication surface. The lubricant distribution block 34 can be secured to a plate 38 on the lubrication surface facing side of the plate 38. The lubricant distribution block 34 extends upward or outward from a connection with the plate at a height equal to the inside or gauge face of the area targeted for lubricant distribution. The application nozzle 32 is oriented to face the intended distribution surface. In a further embodiment, the applicant nozzle 32 may extend toward the surface to be lubricated. The plate 38 with the application nozzle 32 together form the lubricant distribution block 34. The lubricant distribution block 34 is secured by a mounting attachment 42 or other suitable mechanism to an end of a piston rod or hydraulic cylinder 44.

The lubricant distribution block 34 is connected to a flexible hydraulic hose 46. A solenoid operated hydraulic valve section 54 provides hydraulic pilot pressure to shift the lubricant distribution block 34. The hydraulic activation valve section 58 provides hydraulic pressure to operate the hydraulic reciprocating lubrication pump 28. The lubrication pump 28 provides pressurized grease to the lubricant distribution block 34. The lubrication distribution block 34 provides pressurized grease for distribution to the rail.

As further illustrated in FIGS. 3 and 4, the piston rod or hydraulic cylinder 44 is connected to the grease distribution block 34. The piston rod or hydraulic cylinder for lubrication distribution 44 is also connected to the hydraulic cylinder barrel 60. The hydraulic cylinder barrel 60 lies along the length of the linear side rack. The hydraulic pressure reducing and directional valve section 62 provides bi-directional hydraulic pressure to operate the hydraulic cylinder barrel 60. The hydraulic cylinder barrel 60 provides the linear bi-directional motion for the lubricant distribution block 34. The hydraulic directional valve section 62 provides hydraulic pressure to operate the hydraulic cylinder 44. The hydraulic cylinder 44 moves the grease distribution block 34 into the application or stored position. The hydraulic valve section 56 provides a heating circuit that goes through entire conduit that goes out to the slide rack and back to the control module.

In further detail a flow line for each element, lubrication and pressure and return, connects the control module 10 and the linear side rack 30. The flow lines are comprised preferably of a steel tube 68 and 70 for each pressure function. Each steel hose is set externally underground, between the control module 10 and the linear side rack 30. Each opposing end of each steel tube 68 and 70 is connected to an adapter. The opposing end of each adapter is then connected to a flexible hose. Hoses (not shown) are connected to the control module 10. Additional hoses 76 and 78 are connected to the linear slide rack 30 completing the flow line. Each connection of a flexible hose 76 and 78 to steel tube 68 and 70 is completed by a suitable adapter or fastener 80 to seal the connection from potential leaks. Each corresponding flexible hose 76 and 78 inside the linear slide rack 30 connects to the corresponding application component. An additional steel tube 82 is connected in the same fashion as described above to a flexible hose 46 in the linear slide rack 30 for lubrication flow.

A metal detecting proximity switch (not shown) allows for automatic lubrication, reset and reverse sliding of the applicator slide 40. The lubrication process can additionally be initiated manually on demand. Operation begins when a signal, whether automatic or on demand, is sent to the hydraulic pump 22. The hydraulic pump 22 will then initiate the flow of lubrication to the grease distribution block 34 and pressure to initiate movement of the application slide through the process described above.

The process begins as a train approaches the area of track in need of lubrication. Automatic lubrication is initiated by the metal detecting switch, which is triggered by a train's proximity to the linear side rack 30. Sliding extension of the lubrication application block 34 and application of the lubricant begins immediately prior to train wheel contact with the rails. The full lubrication application process of the selected area of track is carried out quickly. The process is initiated when the train is in close proximity to the portion of track and is complete immediately prior to train wheel contact. Further, on demand lubrication follows the same process, however an operator using a switch (not shown) in the control module 10 initiates lubrication. Lubrication can be bi-directional or set automatically for reset and reverse sliding to the initial position.

In a further embodiment the module 10 is equipped to send information to rail road personnel regarding maintenance and care of the module 10 as well as conditions of the system including lubricant levels, fuel level, operational condition and any other pertinent information regarding operation of the system. System updates may be sent from the control module to a mobile device or computer via text, voice or e-mail message.

Although the present invention has been described with reference to preferred embodiments, workers skilled in the art will recognize that changes may be made in form and detail without departing from the spirit and scope of the invention.

What is claimed is:

1. An apparatus for applying lubrication to a rail road track, the apparatus comprising:
   a control module;
   a housing;
   a lubricant distribution block; and
   a plurality of tubes for connecting the control module to the housing wherein the housing houses the lubricant distribution block, the housing being connected to the control module by the plurality of tubes and wherein the control module is positioned in close proximity to the rail road track and the housing is positioned adjacent to and along a section of rail road track to be lubricated, wherein the housing houses the lubricant distribution block and hydraulic components for operating the lubricant distribution block, a distribution nozzle configured to extend outwardly from the lubricant distribution block, the distribution nozzle extendable in a direction of the section of rail road track to be lubricated, and wherein the lubricant distribution block and distribution nozzle are slideably operable relative to the housing by the hydraulic components along a longitudinal direction of the section of the railroad track.

2. The apparatus of claim 1 wherein the control module comprises pressure, power and lubrication storage components.

3. The apparatus of claim 1 further comprising the lubricant distribution nozzle, the nozzle attached to a grease distribution valve.

4. The apparatus of claim 3 wherein the lubricant distribution nozzle is approximate at a same height as a gauge face side of the section of rail road track to be lubricated.

5. The apparatus of claim 1 further comprising a mechanism in the control module for initiating lubrication manually.

6. The apparatus of claim 1 further comprising a mechanism in the control module for initiating lubrication automatically, the mechanism comprising a sensor for detecting an approaching train.

7. The apparatus of claim 1 wherein the plurality of tubes provide lubricant and hydraulic pressure for operation of the lubricant distribution block.

* * * * *